Nov. 28, 1939.  W. K. CRESON  2,181,783
HORN BUTTON
Filed March 24, 1938
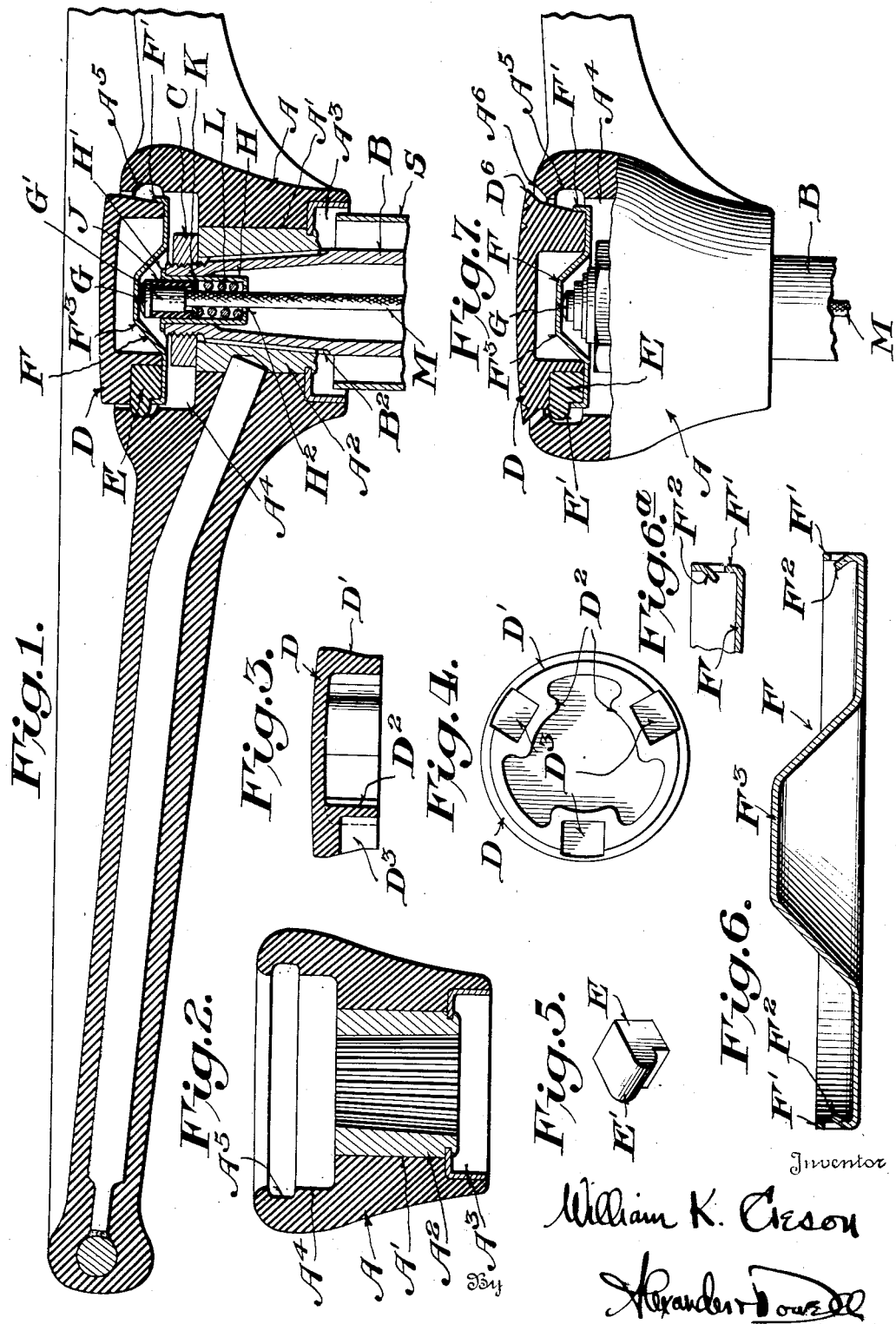

Patented Nov. 28, 1939

2,181,783

UNITED STATES PATENT OFFICE 2,181,783

HORN BUTTON

William K. Creson, La Fayette, Ind., assignor to Ross Gear & Tool Company, La Fayette, Ind., a corporation of Indiana Application March 24, 1938, Serial No. 197,931

5 Claims. (Cl. 200—59)

The invention is an improvement in so-called "horn button" switches used on steering shaft assemblies of automobiles but may be used in other combinations, the present invention being an improvement upon that shown in United States Letters Patent #2,061,222, dated November 17, 1936.

The principal objects of my present invention are to provide a very simple construction which will reduce material and cost, will eliminate noise of rattling, and will eliminate use of screws or other conventional means of attachment; also a construction in which easy access is provided for servicing the component parts as same requires handling of only a minimum number of parts in assembling the button, and the parts can be quickly and easily assembled and securely retained in operative position, and may be removed quickly and easily to permit access to the underlying parts for repair or replacement, without having to manipulate screws or other disconnectible fastenings.

Other objects of the invention will be hereinafter set forth.

In the accompanying drawing I have illustrated several practical embodiments of the invention, and I will describe the same with reference thereto, to enable others to readily understand and use the invention, and in the claims I have summarized the essentials of the invention, and the novel features of construction, and novel combinations of parts, for which protection is desired.

In said drawing—

Fig. 1 is a vertical section through the upper end of a steering post provided with my novel horn button assembly;

Fig. 2 is a vertical section through the hub of the steering wheel, detached;

Fig. 3 is a vertical section through the horn button, detached;

Fig. 4 is a bottom plan view of the horn button, detached;

Fig. 5 is a perspective view of one of the rubber inserts used to support the horn button in the hub recess.

Fig. 6 is an enlarged vertical section through the contact plate of the horn button, detached; and showing the means for connecting the contact plate to the horn button; and Fig. 6a shows an optional means;

Fig. 7 is a vertical section showing a modification.

As shown, the steering wheel includes a hub A, having spokes and rim in the usual manner.

Hub A is provided with a relatively large intermediate axial bore A' adapted to receive a bushing A2 secured therein in any desired manner, with its ends terminating within the hub, said bushing A2 having an upwardly contracting tapered bore provided with serrations adapted to receive the correspondingly tapered and serrated end B2 of the steel steering tube B, which tube projects beyond the upper end of bushing A2 and is externally threaded to receive a large steel nut C which locks the hub A on the steering tube B. Around steering tube B is the usual fixed outer casing S of the steering post, the upper end of which terminates within a large circular recess A3 at the lower end of the hub. Hub A is also provided above bushing A2 with a large circular recess A4 within which the horn button is mounted, the side wall of said recess A4 adjacent its outer end preferably having an annular groove A5 therein of substantial width.

The horn button D is preferably formed of hard rubber, Bakelite or other plastic composition, but may if desired be formed of metal, and comprises a disk of diameter slightly smaller than that of recess A4 in hub A. As shown in Figs. 1, 3 and 4 disk D is provided with a peripheral depending flange D' of shorter depth than recess A4, the flange D' having a plurality of evenly spaced thickened portions D2 on its inner face, three such portions being shown in Fig. 4 evenly spaced 120° apart. In the outer and lower faces of flange D', opposite each of the thickened portions D2 are recesses D3 preferably but not necessarily of rectangular cross-section, adapted to receive flexible elastic inserts E shown in Figs. 1 and 5, and comprising soft rubber blocks adapted to fill the recesses D3, the outer ends of inserts E projecting beyond the outer face of flange D' and into the annular groove A5 in the hub recess A4. Preferably the projecting ends E' of the inserts are of less height than the width of the annular groove A5 so that when button D with inserts E are assembled in the recess D4 the inserts may be moved axially of the annular groove A5, whereby button D may be either depressed axially of the recess A4 or the button may be tilted in said recess A4 by pressure applied to the periphery of the button. While I prefer to use an annular recess A5 to receive the ends of inserts E, the same is not necessary as individual recesses might be formed or molded in the side walls of recess A4 to receive same.

Inserts E are retained within the recesses D3 by a steel or brass plate F (Figs. 1 and 6) forming one electric contact of the switch. Plate F comprises a disk having a narrow upstanding peripheral flange F' adapted to fit tightly over the lower edge of flange D' of the button, flange F' having a series of spaced tongues F2 (Figs. 6a and 6) staked or struck-out of the body thereof, the tongues being pressed inwardly so as to bite into the material of button D, thereby securely maintaining the contact plate F secured to the underside of button D, the plate also partially closing the recesses D3 and thereby retaining the bodies of the inserts E therein.

The central portion of contact plate F is offset upwardly as indicated at F3 in Figs. 1, 6 and 7, and a vertically yieldable connector G abuts against portion F3 whereby the button D can rock within recess D4 in all directions pivoting on connector G, or the button can be depressed within the recess axially of the steering tube B. Preferably the offset portion F3 is of smaller diameter than the nut C which locks the steering wheel hub A to the steering tube, and the button flanges D' are of such depth that the contact plate F will be normally spaced from but parallel with the top of nut C, said nut forming the other electric contact of the switch and the metal of the steering tube and vehicle frame forming the return circuit from contact nut C to the battery of the automobile in the usual manner.

Button D is normally yieldably maintained in raised position so that the elastic inserts E are at the upper end of the annular groove A5; and as shown, the upper end of steering tube B extends slightly above nut C, and a flanged brass or steel cup H of substantial length extends downwardly into tube B, the exterior flange H' of the cup seating upon the end of the steering tube. The lower end of cup H is provided with an interior flange H2 and within cup H is a bushing J of fibre, Bakelite or other non-electrical conducting material adapted to slidably engage the walls of the cup. The electric lead M for contact plate F extends through steering tube B and into cup H and is secured to the lower end of a cylindrical member G' of brass, steel, or other electrical conducting material substantially filling the bushing J, said member G' having an enlarged head G overlying the upper end of bushing J, said head G normally contacting the plate F within the offset portion F3. At the lower end of bushing J within cup H is a washer K, also of non-conducting material such as fibre or Bakelite, and between washer K and the internal flange H2 of cup H is a coiled spring L normally urging the head G upwardly so as to maintain electrical contact with the underside of contact plate F. Spring L however permits the button D to be depressed axially of steering tube B, or the button D may be tilted within recess A4 upon the head G as a pivot so as to bring any portion of contact plate F into electrical contact with the nut C.

In Fig. 7 a modification is shown in which the recess A4 above the annular recess A5 is countersunk as at A6, and the periphery of button D has a correspondingly shaped peripheral bead or rib D6 at its upper outer edge, the portions A6—D6 serving to conceal from view the underlying or inner working parts of the switch.

When it is desired to service the switch, the button D may be pried upwardly so as to free the elastic inserts E from the annular groove A5, and the button D with inserts E and plate F then removed as a unit from the hub, exposing the underlying parts. The cup H may be readily withdrawn upwardly from the end of tube B due to play in the wire M, and the parts G, J, K, L, or H serviced, and the parts readily inserted again in proper position in the cup H and in the tube B, and the button D with rubber inserts E again depressed in the recess A4 so that inserts again engage the annular groove A5.

My invention thus provides a simple construction whereby the assembly of the switch parts can be quickly and easily performed, and provides easy access for servicing the component parts; also provides a construction in which handling of only a minimum number of parts is necessary during assembly or disassembly; and my construction reduces material costs, and eliminates noise or rattling, and also eliminates the use of screws or other conventional means of attachment.

I claim:

1. In a button switch, a button having a plurality of lateral recesses; elastic inserts in said recesses projecting beyond the sides of the button; a supporting member having recesses receiving the projecting portions of the inserts to support the button while permitting tilting and axial movements thereof; and electrical contacts carried by the button and supporting member respectively adapted to be engaged when the button is moved, the contact on the button comprising a plate having an upstanding peripheral flange fitting over the sides of the button and partially closing the insert recesses to lock the inserts in the button.

2. In a horn button switch for steering post assemblies including a steering wheel hub having an annular recess in its upper face, and including a hollow steering tube connected with said hub terminating within the recess; a fixed contact in the lower end of the recess; a horn button housed within the upper end of the recess for tilting and axial movements therein; a contact plate mounted on the underside of the button normally parallel with and disposed above the fixed contact; and yieldable means engaging the button and normally maintaining the button raised to separate the contact members, said yieldable means being supported within and insulated from said tube and fixed contact and forming the electrical conductor for the contact plate of the button.

3. In a horn button switch for steering post assemblies including a steering wheel hub having an annular recess in its upper face, and including a hollow steering tube connected with said hub terminating within the recess; a fixed contact in the lower end of the recess; a horn button housed within the upper end of the recess for tilting and axial movements therein; a contact plate mounted on the underside of the button normally parallel with and disposed above the fixed contact; and yieldable means engaging the button and normally maintaining the button raised to separate the contact members, said yieldable means comprising a flanged cup within and supported by the end of the steering tube, a bushing of insulating material slidably mounted within the cup, a conductor member carried within the bushing and having an enlarged head overlying the upper end of the bushing and contacting with the contact plate of the button; an electric conductor wire within the steering tube entering the cup and insulated therefrom and connected with the headed member; and a spring within the cup around the conductor and interposed between the lower end of the cup and the bushing.

4. In a horn button switch for steering post assemblies including a steering wheel hub having an annular recess in its upper face, and including a hollow steering tube connected with said hub terminating within the recess; a fixed contact in the lower end of the recess; a horn button housed within the upper end of the recess for tilting and axial movements therein; a contact plate mounted on the underside of the button normally parallel with and disposed above the fixed contact; and yieldable means engaging the button and normally maintaining the button raised to separate the contact members, said button comprising a disk provided with a plurality of lateral recesses; a plurality of elastic inserts projecting from the recesses and entering recesses in the hub recess, and said contact plate having an upstanding peripheral flange fitting over the sides of the button and partially closing the recesses to lock the inserts therein.

5. A switch button comprising a disk provided with lateral recesses receiving radially disposed elastic inserts projecting outwardly from the sides and adapted to mount the button in a support; and a contact plate having an upstanding peripheral flange fitting over the sides of the disk and partially closing the recesses to lock the inserts therein.

WILLIAM K. CRESON.